United States Patent [19]

Szpindel

[11] 4,273,964
[45] Jun. 16, 1981

[54] RING AND TONE PLANT

[76] Inventor: Motek Szpindel, 73 Palm Dr., Downsview, Toronto, Canada

[21] Appl. No.: 944,647

[22] Filed: Sep. 21, 1978

[51] Int. Cl.³ ............................................ H04M 1/26
[52] U.S. Cl. ........................... 179/84 R; 179/18 HB; 328/150; 307/38
[58] Field of Search ........... 179/18 F, 18 FA, 18 HB, 179/84 R, 84 VF, 27 G, 175.2 R, 175.2 B, 175.2 C; 307/18, 23, 29, 64, 65, 80, 84, 86; 340/664; 328/8

[56] References Cited
U.S. PATENT DOCUMENTS

| 2,740,845 | 4/1956 | Mills et al. | 179/84 R |
| 3,601,551 | 8/1971 | Weber | 179/84 VF |
| 4,145,577 | 3/1979 | Kojima et al. | 179/84 R |

Primary Examiner—Bernard Konick
Assistant Examiner—Joseph A. Popek

[57] ABSTRACT

A telephone ringing and tone generating circuit including circuitry for generating a plurality of tones, circuitry for generating a plurality of ringing currents and circuitry for generating a plurality of power voltages. Dual sources of each of the generating circuitry are provided. A timing circuit is provided to provide cadence (timing) signals for each of the tones, currents and voltages. Switching devices corresponding to each of the dual types of generating circuitry are operable to switch from one of the dual circuits to the other. Monitoring circuits are provided to monitor the outputs and on detection of a fault in one type of output to switch from the corresponding on line generating circuitry to the back-up.

14 Claims, 8 Drawing Figures

RING AND TONE PLANT

This invention relates to circuitry for providing tones, ringing current, and cadence signals for use by a telephone office.

Examples, in a North American telephone system of tones which may be provided by the invention include dial tone, busy tone, ring tone, reorder tone, high tone, trunk busy tone. Any or all of these may be provided by the circuitry to be described.

Examples in North American telephone systems of ringing current include signals providing ringing current for 2 out of six seconds, interrupted continuous ring, code rings etc. The system may provide ringing current in the above sequences or others, as desired where, in North America, the AC signal applied during the 'on' periods has an alternating current voltage of the order of 75–90 volts and a frequency usually of 20 or 25 Hz.

The cadence power output provides the relatively high direct current voltages (in North America conventionally 48 volts) necessary for operating relays and performing similar functions. The cadence power output provides sequences of such high voltage pulses which may include for example a D.C. pulse (by D.C. pulse is meant the application of D.C. over a predetermined time period) synchronized with the busy tone which the telephone office uses for counting or relay operation, and may include the D.C. pulses required for use at the telephone office to operate equipment to provide selective ringing. The cadence power output in accord with the invention is desired to provide such or other high voltage D.C. pulses in the required cadence.

It is an object of the invention to provide, in one aspect, a ringing generator, a cadence power output and a tone generator for producing signals of the three classes above described, in combination with a timing generator for regulating cadences in the outputs of the foregoing components and means for providing the power therefor.

It is an object of the invention to provide the combination described in the previous paragraph together with an output detector designed to detect failure of any of the signals from any of the components.

It is an object of the invention to provide a pair of systems each having the components referred to in the second preceding paragraph, means for connecting one of said system while the other is placed on standby and means, on failure of a signal from one of the components, for providing the signal from the standby system.

It is an object of the invention as described in the preceding paragraph wherein the circuitry is designed so that failure of a signal from one of the components results in substitution of the corresponding component from the standby system without substitution for other properly functioning components.

It is an object of the invention as defined in either of the two preceding paragraphs, to provide means for detecting failure of a signal in one of the component outputs and for providing an output signal as a result.

It is an object of the invention to provide a circuitry for providing dual tone supply systems for supplying tone signals to a telephone office whereby one tone supply system is connected to the telephone office and the other used as standby, wherein the signals from the connected tone supply are continuously monitored; and means are provided, on detection of failure of a signal from the connected supply, for substitution of the standby system.

It is an object of the invention to provide circuitry for providing dual cadence power output systems for a telephone office whereby one cadence power output system is connected to the telephone office and the other used as standby, wherein the signals from the connected power cadence output are continuously monitored and means are provided, on detection of the failure of a signal from the connected system, for substitution of the standby system.

It is an object of the invention to provide circuitry for providing dual ringing generators for a telephone office whereby one ringing generator is connected to the telephone office and the other used as standby, wherein the signals from the connected ringing generator are continuously monitored and means are provided, on detection of the failure of a signal upon the connected generator, for substitution of the standby generator.

It is an object of the invention to provide a cadence power output for providing signals comprising cyclically repeating pulses of relatively high voltage D.C. for a telephone office, means for detecting an overload on a line carrying one of such signals, means responsive to detection of such overload for disconnecting said pulses from said line and for thereafter reconnecting said pulses to said line. In this way the line and equipment may be protected in the event of overload. However, should the overload be temporary, the disconnected line when reconnected will remain so. Thus the signal is only temporarily interrupted for an overload and is designed so that if the overload is soon removed, the line is returned to service with minimal interruption and without extended disconnection, inspection or replacement.

It is an object of the invention to provide a ringing current supply for providing signals comprising cyclically repeating periods of ringing AC for a telephone office, means for detecting an overload on a line carrying one of such signals, means responsive to detection of such overload for disconnecting said ringing supply from said line and later reconnecting said ringing supply to said line. In this way the line and equipment may be protected in the event of overload. However, should the overload be temporary, the disconnected line when reconnected will remain so. Thus the signal is only temporarily interrupted for an overload and is designed so that if the overload is soon removed, the line is returned to service with minimal interruption and without extended disconnection, inspection or replacement.

In drawings which illustrate a preferred embodiment of the invention:

Figure 1:
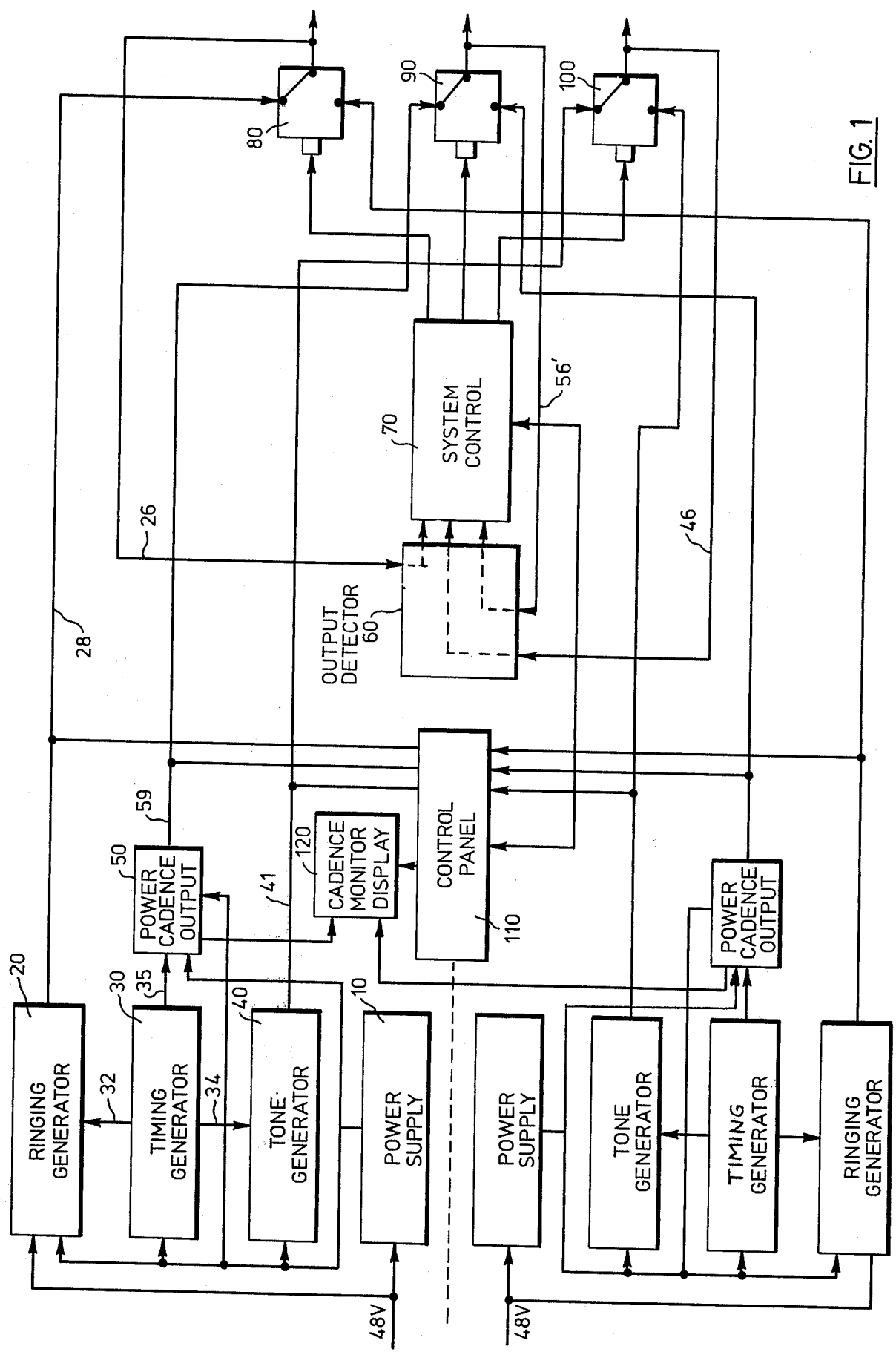
FIG. 1 shows a schematic illustration of a system in accord with the invention.

In the drawings FIG. 1 shows a system in accord with the invention designed to provide duplicate supplies of Ringing AC (sometimes called ringing current herein), Power Cadence DC and Tones.

Accordingly, each of the dual circuits receives 48 volt D.C. from the normal telephone supply and in each of such dual circuits a power supply 10 is designed to provide the DC supply voltages required by the Ringing Generator 20, the Timing Generator 30, the Tone Generator 40 and the Power Cadence Output 50. These components are all duplicated or dual. The duplicated components share common components including an output detector 60 a system control 70 and switching connections 80, 90 and 100. There will usually be provided a control panel 110 and usually a cadence monitor display 120. Power supplies, not shown are provided for the shared equipment.

In each duplicated system the Ringing Generator 20 provides during 'on' periods 75 or 88 volt A.C. ringing current signals over a plurality of output lines represented by line 28. The on and off periods for the A.C. signals on these output lines are respectively determined by signals from the timing generator 30. The output signals from the Ringing Generator 20 are supplied on individual lines to switching means 80 for supplying to the telephone office and, the selected output of switching means 80 is supplied on corresponding individual lines collectively represented by 26 to output detector 60 to be monitored. The Ringing Generator will be described in detail hereafter.

In each duplicated system the Power Cadence Output 50, in effect, amplifies a plurality of timing signals received from the timing generator 30 and delivers corresponding signals at 48 volts D.C. along a corresponding plurality of lines represented by the line 59 to switching means 90. The outputs of switching means 56 are supplied on line 90 to the output detector 60.

In each duplicated system the Tone Generator is designed to provide the audio tones for use by the telephone office. The circuitry for producing such tones is not described here in detail since circuits for producing such tones are well known to those skilled in the art. Such tones include the dial tone, 60 impulse per minute busy tone, 120 impulse per minute busy tone, and so on. The 'impulse per minute' tones comprise periods during which the tone is produced alternating with silent periods. The tones produced by Tone Generator are carried on separate lines to switching means 100 so that line 41 on FIG. 1 represents a group of lines with a line corresponding to each tone supplied. Each tone at the output of switching means 100 is monitored by output detector 60 so that line 46 showing the connection from switching means 100 to the output detector also represents a group of lines.

In each duplicated system a timing generator 30 generates the timing signals necessary for controlling the cadence of the outputs of the ringing generator 20, the power cadence output 50 and some of the outputs of the tone generators 40. The circuitry of the Timing Generator 30 is not shown in detail as a wide variety of designs of a timing circuit for producing such timing signals is easily available to those skilled in the art. However FIG. 2 shows the time graphs for 12 of such signals as a basis for discussion of the relationship of the timing generator to the remainder of the circuit and as a basis for explaining the signals produced by the components. 32, 35 and 34 of FIG. 1 each represent a group of lines carrying individual timing signals.

Figure 2:
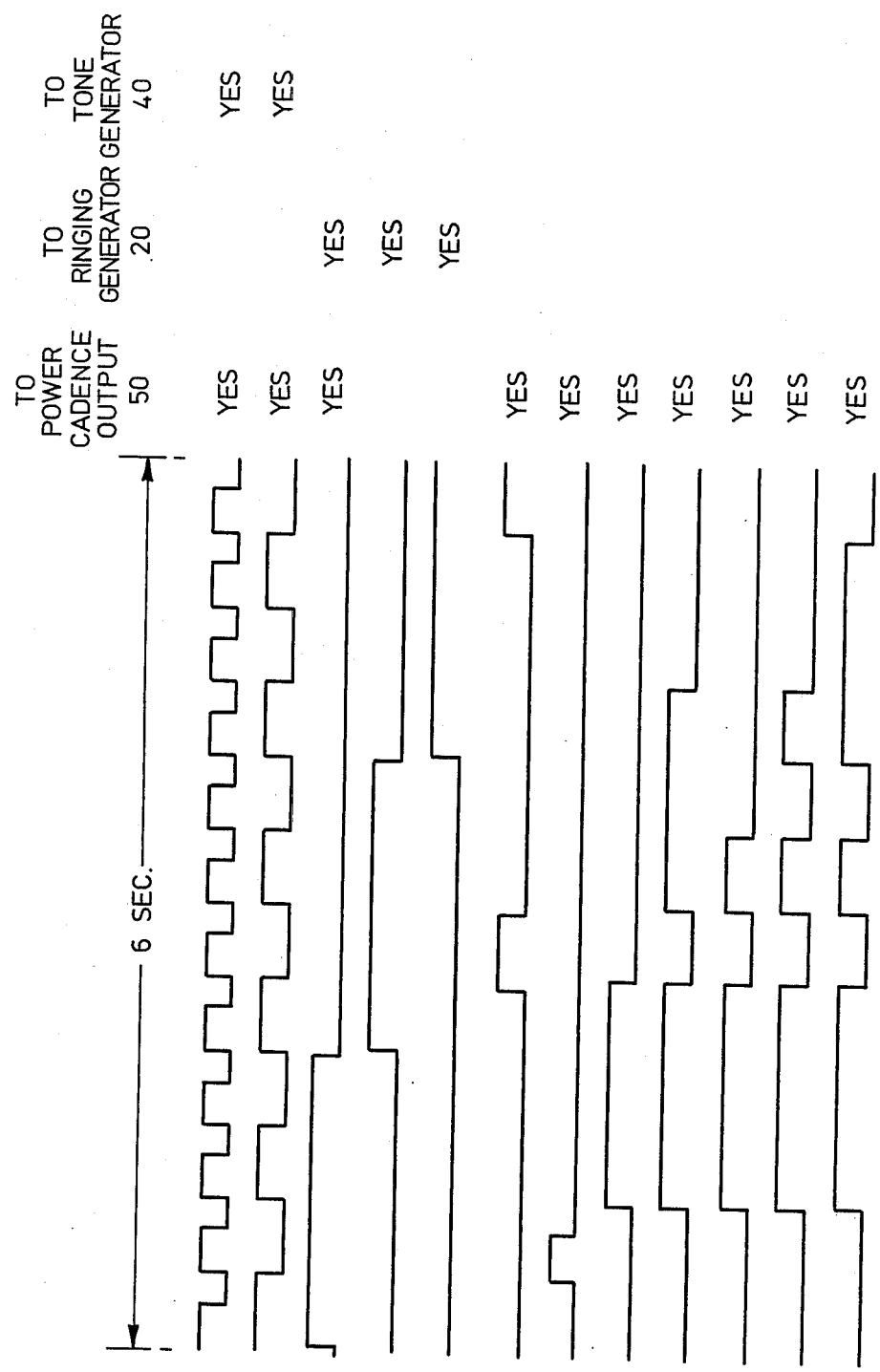
FIG. 2 shows examples of timing sequences used with the invention.

FIG. 2 shows 12 types of timing signals which would be required by components 20, 40 and 50 for supply to a conventional telephone office. As will be obvious these are exemplary only of the types of timing signals which might be used with the circuitry of the invention and signals of other time periods, cadences or cycle length will work equally well with the circuitry shown. Where different timing periods require different circuit parameters than those shown, these may be easily varied by those skilled in the art.

In FIG. 2 an upward and downward location of the signal corresponds respectively to an 'on' and 'off' period for the signal controlled by the timing signal. FIG. 2 uses standard telephone office nomenclature to the left of the graphs and to the right of the graphs indicates the destination of the timing signal. Thus the 'All paths busy tone' timing signal will be supplied from the Timing Generator 30 to tone generator 40 to cause it, in accord with techniques well known to those skilled in the art, to emit its tone on a line forming part of group of lines 41 in 120 impulse per minute time periods. The 'All paths busy tone signal' is also provided to the Power Cadence Output 50 to cause it to produce a 48 volt D.C. pulse during the 'up' periods on the graphs on a line forming part of group of lines 59 (as hereinafter described). The timing signal for 'Line Busy Tone' has the same destinations as those above described.

The third graph in FIG. 2 "INT.RING TONE/INT. RING #1/Code ring CS" represents a signal provided by the timing generator 30 to the Ringing Generator 20 to cause the latter, during the 'up' periods on the graph to emit 75 or 88 V, 20 or 25 HZ AC on a line forming part of group 28. (The operation of the Ringing Generator 20 is described in detail hereafter). The signal represented by the third graph is also transmitted to the Power Cadence Output 50 along a line represented by the group 35 to cause power cadence output 50 to send on a line forming part of group 59, a 48 volt D.C. signal during the 'up' periods of the graph. This signal will be used by the telephone office for operation of relays and similar equipment. The other signals shown in FIG. 2 are directed from the Timing Generator 30 to the destinations indicated in the columns to the right of the graph for causing the production of signals similar to those above referred to.

The equipment represented by components 10, 20, 30, 40, 50 is duplicated as indicated in FIG. 1. (This should not obscure the fact that many of the facets of the invention here described and claimed are characteristic of a system having a single set of rather than duplicated or dual components), or having only one or more of the indicated components. The duplicated equipment shares the components 60, 70, 80, 90, 100, 110 and 120. Each of the duplicated or dual components: the Ringing Generator 20, the Power Cadence Output 50 and the Tone Generator 40 has the status of 'on line' or 'standby' relative to its counterpart as determined (individually for each type of supply) by the position of the respective switches 80, 90 or 100.

The output of an 'on line' component 20, 50 or 40 has each of the outputs in its plurality of output signals monitored by output detector 60 (as hereinafter described). When a failure is determined in an output signal of one of components 20, 50 or 40 (say Power Cadence Output 50) then the output detector detects the fault and produces a signal useful for causing automatically the switching of the corresponding switch (100 for the power cadence output) to take the on line power cadence supply out of service and connect the standby power cadence supply. It will be noted that, in the preferred embodiment of the invention, the any one of the output of components 20, 50 or 40 may be switched from one supply to the other without requiring switching of the other components. System control 70 controls the operating of the switching means 80, 90 or 100 and a control panel 110 and Cadence monitor display may be provided.

RINGING CURRENT CIRCUIT

Figure 4:
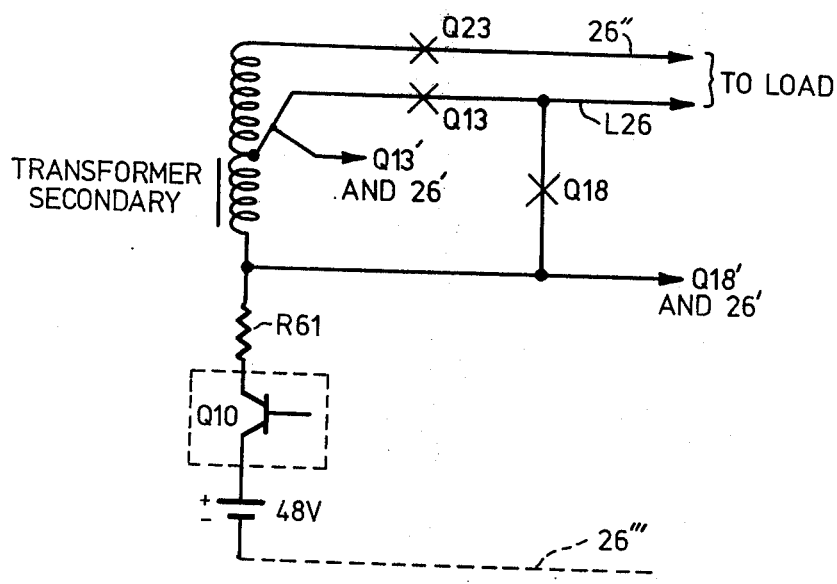
FIG. 4 is a schematic drawing showing the power connections for the ringing current circuit.
Figure 5:
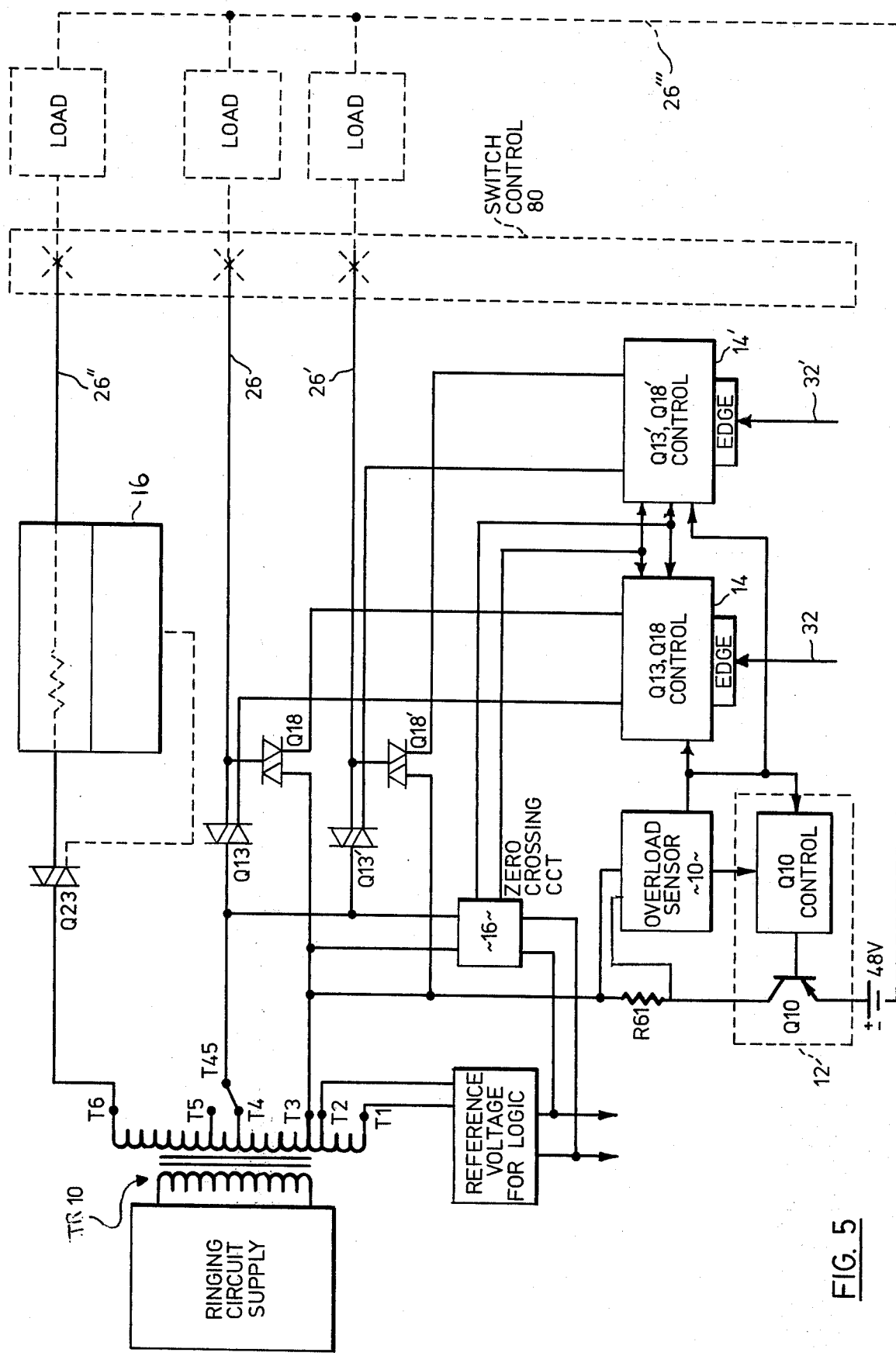
FIG. 5 is a schematic drawing of a preferred arrangement of the ringing current circuit.
Figure 6A:
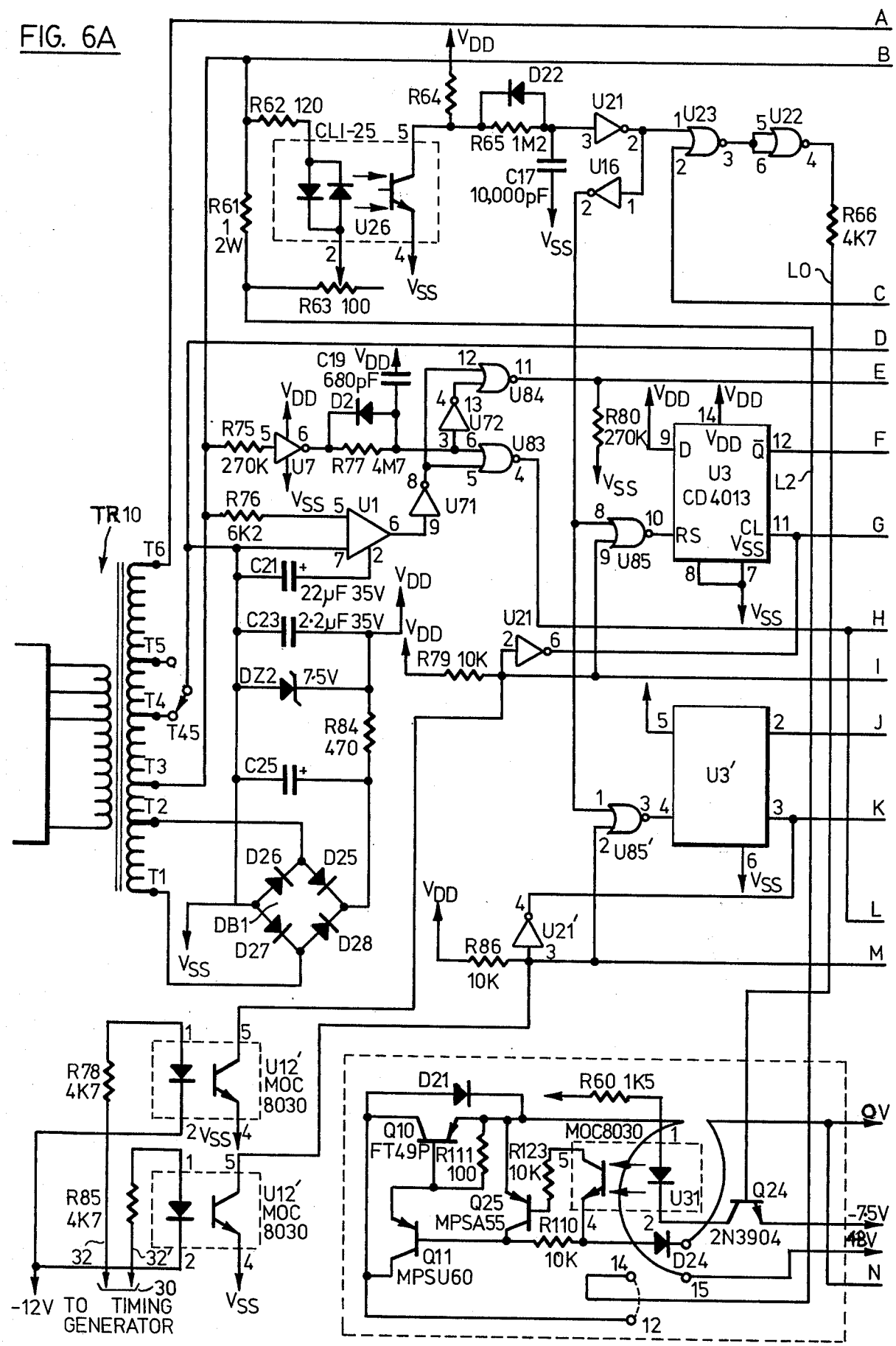
FIGS. 6A and 6B are detailed drawing of the circuit shown schematically in FIGS. 4 and 5.
Figure 6B:
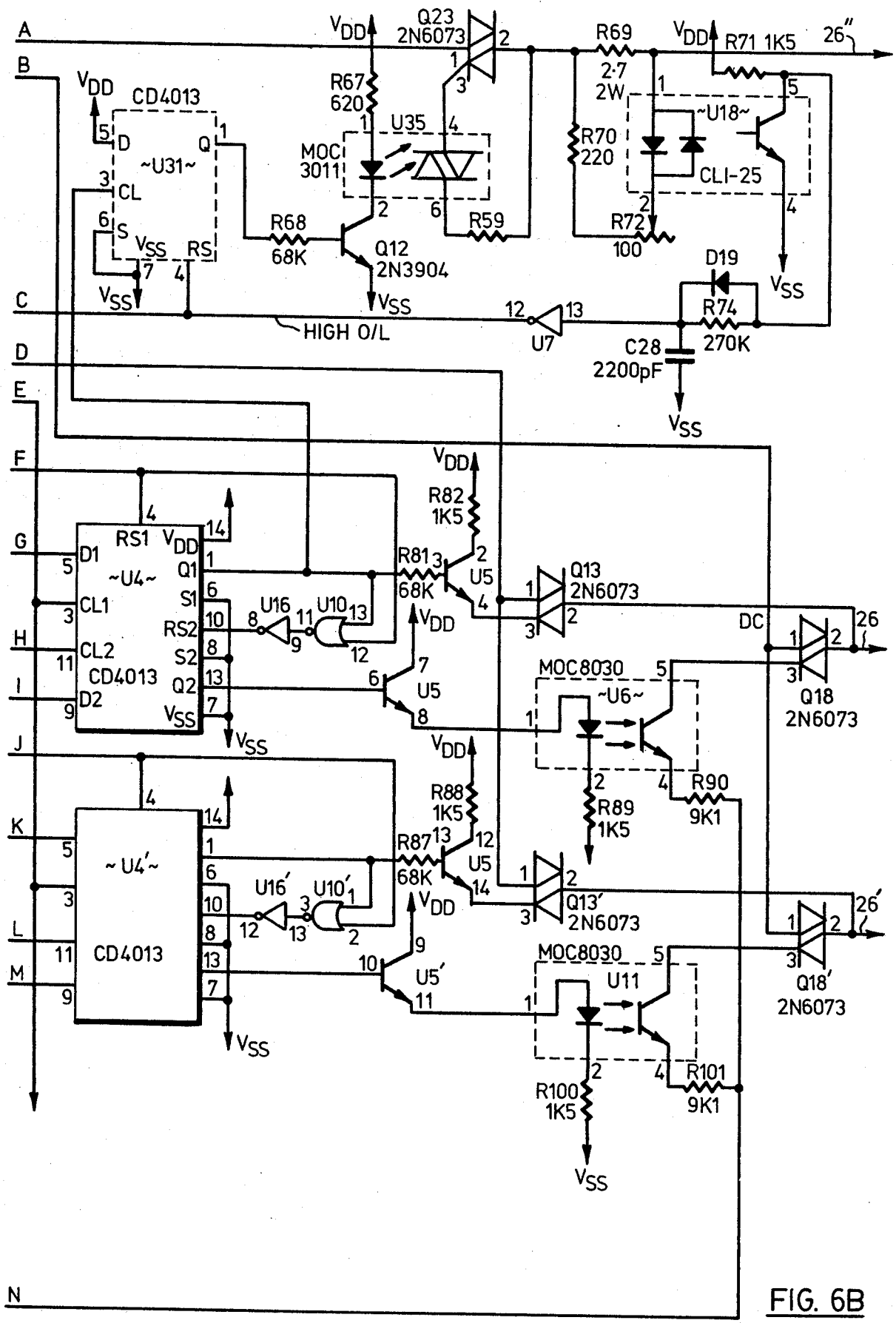

There will now be described, in detail, the operation of the ringing current circuit. The power connections thereof are shown schematically in FIG. 4, the controls are shown in FIG. 5 and the detailed wiring is shown in FIGS. 6A and 6B. FIGS. 6A and 6B must be placed side by side with FIG. 6A to the left, FIG. 6B to the right. The connecting lines between these two Figures are coded "A" "B" "C" to assist in arranging them on registration. A number (two are shown) of Cadence Control Signals are provided by Timing Generator 30 respectively on lines 32 and 32', the number of lines 32 corresponding to the number of ringing sequences required by the telephone office to which the circuitry is connected. Corresponding to each cadence output there is a ringing supply shown as lines 26, 26' each for supplying one of the ringing sequences of AC ringing voltage (with 48 VDC also) to the telephone office. One end of the transformer secondary winding is connected through a one ohm resistor R61 and Q10 transistor to the positive bus of standard telephone 48 V (the emitter towards the +48 V) with battery return. In this case the Q10 will be a PNP type transistor. In case of a "ground" return system Q10 should be NPN type with the emitter connected to the negative bus to the 48 V supply the collector connected to R61 and obvious corresponding biasing and polarity changes made in the circuit.

The 1 ohm resistor R61 serves as a sensing resistor. The voltage drop across this resistor is sensed by the overload sensor 10 to determine the overload condition. Switch Q10 is connected in series with the 48 V and the switch acts to connect and disconnect the 48 volt power from the line as well as the AC ringing power. The connection as shown in FIG. 4 is known as "battery return" while the reverse connection just discussed is known as "ground return". The 48 V supply shown in the drawings is of course the normal 48 V supply for a telephone office.

Reverting to the connections shown in FIG. 5, resistor R61 and its end remote from block 12 is connected to one end of the tap T3 of the secondary of a transformer RT10 and this end of resistor R61 is also connected to a series of switches (preferably embodied by Thyristors) Q18, Q18' etc. which are, on their respective other sides connected along lines 26, 26' through switch control 80 to the telephone office and which each will be connected through a load to the ring return which is the opposite end of the 48 volt battery from that connected to Q10. A tap T4,5 on the secondary winding of transformer TR-10 corresponding to either 75 or 88 VAC is connected to series of switches Q13, Q13', connected respectively to lines 26, 26' each correspondingly respectively to the lines 32, 32'. A control 14 for switches Q13 and Q18 has an "edge" input (operable on the transition only of the signal level at the input) and a similar control 14' is provided for Thyristors Q13' and Q18'. The transformer secondary is also tapped and energizes a zero crossing circuit 16 from tap T3 and T45 for determining the approximate zero crossings of the AC output between T3 and T45 and the zero crossing detection signals developed by circuit 16 are applied to controls 14 and 14'.

The transformer TR10 and its control is customarily designed to provide 20 or 25 HZ ringing circuit.

The output of the overload sensor 10 is provided to controls 14 and 14' and to the control for switch Q10. A 105 volt ringing supply is provided from tap T6 on line 26" through a switch Q23 controlled by a overload sensor 16 so that if there is an overload on the line 26" switch Q23 will be opened as hereinafter discussed.

The schematic loads connected to line 26, 26' and 26" are of course a connection across the line to 26''' through a load at the telephone office or on equipment connected to the telephone office.

In operation, the switches Q13, Q18, Q13', Q18' are normally opened and the switch Q10 is normally closed, a transistion of the signal on cadence input line 32 to initiate a ringing cycle on line 26 activates the edge control of block 14 to cause the closure of switch Q13 to provide the AC signal on line 26, in the absence of an overload on 26. The zero crossing signal to control 14 from zero crossing detector 16 is used by control 14 to switch on Q13 at approximately the zero crossing for the A.C. When the ringing period is ended the cadence input on line 32 makes a corresponding transition, thus opening Q13 and the signal from the zero crossing detector again ensures that the opening of Q13 occurs at approximately a zero crossing. The control 14 disconnects switch Q13 and very soon thereafter connects the 48 volt supply by closing Q18 to supply D.C. power on line 26 to operate the relays at the telephone office or connected thereto between the periods of application of the ringing current. When the ringing current is again to be sent Q18 is opened Q13 is closed and the cycle repeats.

As will be appreciated, a different cadence is controlled by the cadence input on line 32' and this is supplied to control the control 14' which in turn, and with zero crossing detector 16 controls the operation of Q13' and Q18', to provide the ringing current on line 26', in accord with the signal provided on line 32'. More lines 26 may be controlled in a similar manner to that described above for 26 and 26'. However it should be noted that the logic, hereinafter described in more detail, described in the specific embodiment, is designed to operate with a system where there is only ringing current on one line 26 at a time. Thus if there is a system where ringing current is to appear simultaneously on two lines 26, the logic would be altered from that shown.

It will be noted that the reason that it is preferred to initiate and, under non-overload conditions, to terminate the application of ringing current to lines 26 during approximately the zero crossing thereof. This reduces surge and transient currents and their damaging effect on telephone office equipment.

When an overload condition exists a drop occurs across R61 which causes Q10 control to open Q10. The control for Q10 provides a time delay so that Q10 cannot be reconnected before (if the overload occurs during ringing current) the controls 14 or 14' have had the opportunity to disconnect the switches Q13 or Q13'. On overload, a signal is also supplied from overload sensor 10 to whichever of circuits 14 or 14' is then causing the output of ringing current control to open the corresponding switches Q13, and it will be noted that any control which is not then sending ringing current will not be reset in accord with the logic to be described.

Opening of Q10, Q13 removes the overload by removing the power. Q10 may reclose after the time delay period has expired. However the removal of the overload does not allow Q13 to reclose in view of the requirement for edge actuation on line 32 to operate control 14 so that Q13 does not close until the next cadence cycle indicates the requirement for application of ringing current when it will again reopen if there is still an overload or will allow the normal ringing current cycle to continue if the overload is removed.

It will be noted that when an overload is detected those controls 14 which do not have a ringing period in progress are not affected and, so far as the inventive circuit is concerned the circuits associated with such controls 14 will be protected by the opening of Q10 for the time delay period and by fuses or other overload devices in the telephone office equipment.

It will be noted that a separate 105 volt output 26″ is provided with its own overload sensor which opens Q23 if there is an overload and the time delay is provided in this, to be described, to prevent oscillation.

Before describing the Ringing Generator circuitry in detail it is noted that in the claims: the AC supply mentioned is embodied in the output of transformer TR10, the D.C. supply is embodied in the normal 48 volt supply, the first switching means is Q18 (or Q18′) as controlled by control 14 (or 14′) the first and second control signals will be those received along lines 32 (or 32′) the second switching means is embodied by Q13 (or Q13′) as controlled by control 14 (or 14′), the means for sensing an overload is embodied by R61 and sensor 11 while the third switching means is embodied by Q10.

In the detailed drawing of FIGS. 6A-6B the logic elements are as shown and the designations as indicated and it is noted that elements U4 U4′ U3 U3′ U14 U14′ are edge operated i.e. they change state only upon a transition of the input signal and the remaining elements are operated in accord with the state of the input.

The element electrical values and designations given are exemplary only as illustrating those used in the preferred circuit. The reference power supplies for the logic elements shown in FIG. 5 are not illustrated or referred to where these will be obvious to those skilled in art. The upward arrows VSS and the downward arrows VDD in the logic circuitry indicate connection to the corresponding arrows at the circuitry connected to the taps T1-T2 of the transformer.

In FIGS. 6A-6B the left side of transformer TR is the primary of a transformer and means well known to those skilled in the art are provided for providing 20 or 25 cycle current. The secondary is provided with taps T1, T2, T3, T4, T5 and T6. The taps T1 and T2 provided with a circuit comprising the diode bridge DB1, the capacitors shown and the zener diode DZ2 to provide a D.C. voltage of 7½ volts with a positive output $V_{DD}$ and a negative output $V_{SS}$ are connected to these outputs. It will be also noted that the $V_{SS}$ output is connected to tap T45 for connection to tap T4 or T5 being whichever of the 75 or 88 volt output is being used, since the ringing tone output appears across tap T3-T45 it will be seen that $V_{SS}$ rides with the alternating current voltage and VDD rides 7½ volts above (the voltage $V_{SS}-V_{DD}$ being therefore effectively direct current so far as the logic circuitry is concerned). The voltage across taps T3-T6 represents the 105 volt ringing current. Tap T3 of the transformer is connected as shown to terminals 1 of thyristors Q18 to Q18′ and through the resistor R61 to the positive end of the 48 volts supply. Tap T4 is connected to terminals 1 of the thyristors Q18, Q18′ to be for supplying the DC current to lines 26, 26′ when the thyristor Q18, Q18′ is conducting. Tap T4,5 is connected to terminals 1 of thyristors Q13, Q13′ to supply the 75 or 88 volt ringing voltage to the lines 26, 26′ respectively when the respective thyristor Q13 or Q13′ is conducting. The transistor Q10 is connected between a minus 48 volt supply and the ring return line to connected loads. The control block 12 on FIG. 5 now will be described in relation to the elements on FIGS. 6A-6B. As hereinafter described, a line LO from the overload detector to transistor Q24 is normally low to maintain transistor Q24 normally off. Q24 off maintains the output transistor U31 non-conducting. U31 output off maintains the Darlington pair Q11-Q10 on so that Q10 connects the positive of the battery supply to the transformer over line L2 and R61.

When the resistor R61 detects an overload the voltage drop thereacross is sufficient to activate U26 which turns on the output transistor of U26 supplying a low to the input of U21. The terms 'high' and 'low' as used herein in relation to the operation of the logic elements refer to more positives and more negative potentials above and below the operating threshold of the logic device. It will be realised of course, that with different logic elements these polarities may be inverted within the scope of the invention. This input is maintained low for a predetermined interval by the time delay circuit comprising R65, D22 and C17, here about 10 milliseconds. The low at U21-3 produces a low at U23-3 and a high at U22-4 which is on line LO to Q24 which will turn on Q24. Q24 on will activate U31, whose output transistor then conducts and applies zero volt to the base of Q25. Q25 applies positive 48 volt to the base of Q11 turning it off and consequently turning off Q10 thus interrupting the ringing path to any connected load. Since the disconnection of DC and AC supply from connected loads removes the drop across R61 it is necessary to avoid immediate reconnection of Q10. Thus the time delay provided by D22 and R65 and C17 maintains Q10 open for a sufficiently long period to allow any closed switches Q13 to be disconnected by logic circuitry to be described, or to allow fuses associated with the telephone office circuitry to operate. After the expiration of the time delay, the high at U21-3 results in a low at Q24 causing the Darlington pair Q11-Q10 to again conduit and connect D.C. power over Q10 to the line. The low at U21-3 resulting from detection of an overload results in a high supplied to an invertor U16-1 resulting in a low supplied to the inputs U85-8, U85′-8 of NOR gates U85, U85′ (which perform a negative going Nand function). The logic circuitry for control of the switches Q-13 and Q-18 will now be described.

A zero crossing detector U1 has one input connected to tap T45 and its other input connected to T3 through R76. The output of U1 produces a pulse at each zero crossing of the transformer output, i.e. at twice the alternating current frequency. Invertor U7 has its input connected to tap T3 of the transformer. The reference voltages for U7 are, connected to $V_{SS}$ and $V_{DD}$, as shown in connection with U7. In general however, the logic elements of FIG. 5 do not have their reference voltage connections shown where these would be obvious to those skilled in the art. The operation of U7, the time delay circuit comprising R77, C19, and D2, invertors U71 and U72 in combination with the inverted output at U71-8 from the zero crossing detector, is to provide at the output 4 of U83 a positive pulse when there is a zero crossing of the AC going positive and to provide at the output 11 of U84 a positive pulse at the zero crossing of the AC going negative. The pulse from U84-11 is applied to the CL 1 inputs of latches U4, U4', and acts to place on the outputs Q1, of the respective latches U4, U4', the state of the corresponding inputs D1. The output of U83 is applied to the terminals CL 2 of the latches U4, U4'. It will be noted that U4 and U3 are edge operated devices. Thus a positive going change at input D1 or D2 of U4 or U4' changes the input stage of these devices but the mere existence a 'high' or positive potential at D1 or D2 does not change the latch setting even though pulses are received at the CL inputs.

Blocks U4 and U4', it will be noted really combine two independently operating latches in one and each may be replaced by a pair of latches if desired.

Describing the remainder of the operation in relation to cadence line 32 and ringing line 26 (or 26') at the same time as the circuitry shown: with no signal on cadence line 32, terminal 5 of U12 is high keeping U21-6 low, and input to D2 of U4 is low because of a previous negative transition and U21-6 supplies a low input to CL 11 of U3 and D1 of U4. Thyristor Q13 will be open so that there is no AC from T4,5 applied to line 26 and thyristor Q18 will be closed allowing the connection of DC from the 48V and R61 to line 26. In the absence of an overload, Q10 will be closed.

When the line 32 goes high to representing a signal from the Timing Generator 30 that a ringing period is required on line 26, then U12 is activated rendering its output transistor conducting and switching output terminal 5, low. This low is applied to the connected terminals. In the absence of an overload this low will not affect U85-10 since U85-8 is high in the absence of an overload. The switch of D1 terminal 5 of U4 to high (since U21-2 went low) sets the upper half of latch U4. The lower half of latch U4 is reset by the signal from U4-1 over U10 and U16 so that Q2 (U4-13) goes negative which results in the turning off or opening of Q18. (To turn off, thyristor Q18 requires a lower than threshold voltage on gate 3 and a lower than threshold voltage across terminals 1-2. Thus Q18 turns off because not only the gate 3 is low but because when Q13 is closed (next to be described) on a zero crossing, there is then substantially 0 voltage across Q18 1-2). With D1 of U4-5 high the next negative going zero crossing detected at the circuitry upto U84-11 produces a high at U4-3 (CL 1) which provides the high output at Q1 which turns on U5 and Q13 supplying ringing current from T45 to line 26 (at substantially the same time as the switching off of Q18).

In the absence of an overload during the ringing period (when Q13 is conducting) then at the end of the period line 32 goes low, U12 is turned off, U12-5 goes high and the resultant high is applied to U4-9 to alter the input D2 while the resultant low from U21-6 is applied to U4-5 to alter the input D1 and U3-11. On the next negative zero crossing the signal at U4-3 causes the signal at U4-1 to turn off U5 and to remove voltage from gate 3 of Q13 which will turn off since Q13-1-2 is at approximately zero voltage at the time because it is at approximately zero crossing. One half cycle later, the positive going zero crossing results in the application of a pulse to U4-11 resulting in an output signal at U4-13 turning on U5 and U6 and turning on Q18 to supply D.C. to line 26 required for such functions as tripping the ringing relays at the telephone exchange during the silent period. At the end of the 'silent period' when the ringing signal is again applied on line 32 the cycle repeats.

If an overload occurs when Q13 is off, Q18 on, the overload does not affect the logic circuitry just described since U85-9 is high and U85-10 is low regardless of the low, resulting from the overload on U85-8. In this event the overload will be during the application of DC to the telephone company circuits on line 26 and the line will be protected by the opening of Q10 for the set period and by the telephone company's fuses or other equipment.

If an overload occurs during the application of AC, Q13 is conducting Q18 is off then U85-9 is low when U85-8 is low due to the overload, and the resulting high from U85-10 resets U3 which resets U4 by the high signal from U3-12 to U4-4. This turns off U5 and Q13 at gate Q13-3 through the signal from U4-1. As previously noted Q10 is maintained off for a sufficiently long time that Q13 may turn off. Q10 off removes the low at U85-8 but U4 is not reactivated by the high at U85-10 since the high at U4-5 has remained and there has not a positive going edge subsequent to the reset to reactivate D1. Thus Q13 remains off until switched on at the beginning of the next cadence period. Should the overload be still subsisting at that time Q13 will again be reopened as above described, and this will continue until the overload is removed. It will be noted that the high at U3-12 resulting from an overload during the ringing period resets the lower part of U4 at U4-10 and D2 will be set by the edge at the end of that ringing period.

It should be noted that an overload during the ringing period for line 26 (Q13 closed) will not affect the logic of circuits for other cadences. Thus, although the low (an overload) signal from U16-2 is applied to an input of each NAND gate (i.e. U85, U85' etc) corresponding to a cadence control line, all cadences not then on will ensure that the other input to the NOR gate is high so that the output U85-10 will be unaffected. Conversely, if an overload occurs during D.C. for some cadence controls the resulting signal from U16-2 will shut off the AC opening the respective Q18 or Q18' switch of any sequence which happens to be delivering ringing current at that time.

It will be noted that since Q18 is to supply only DC current it can be replaced with a transistor and then to turn "off" this device zero crossing switching is not required. Q18 may also be replaced with a SCR placed in the proper direction. These alternatives are within the scope of the invention. However the embodiment shown is preferred, using a thyristor for Q18 since there is then no requirement for reversing the polarity of a diode or SCR when the block 12 is reversed between battery and ground return.

The 105 V ringing supply will now be discussed and, as shown, is provided from tap T6 over terminals 1-2 of thyristor Q23 to line 26". Under normal start operation the signal from Q1 (U4-1) (any other Q1 output such as from U4'-1 could have been used) is used to provide the clock signal to U31 applied to U31-3 to cause U31-1 to turn on Q12, turning on 4-6 of U-35 to cause Q23 to conduct and providing the 105 volt A.C. to line 26". In the absence of an overload on a line connected to line 26", Q23 will continue to conduct and the 105 volt ringing current will be supplied. When the current on this line 26" does not exceed a predetermined amount, (in the preferred embodiment 400 ma), the voltage drop across R69 is not sufficient to activate U18, U18-5 is high, U7-12 is low. When there is an overload on line LCR, the drop across R69 activates U18 which sends U18-5 low, U7-12 high (over the time delay circuit comprising R74 and C28). U7-12 high resets U31, U35 is deactivated and Q23 is opened to remove the AC from Line LCR. The high at U7-12 is also applied to U23-2, and like a high from U21-2 previously described will create a signal from U22-4 which will disconnect Q10. The time delay circuit comprising R74 and C28 is designed to prevent reclosing (or oscillation) of Q10 until Q23 has had time to open.

POWER CADENCE OUTPUT

Power Cadence Output Circuit (50 of FIG. 1 and shown in FIG. 3) consists of a number (here 8 similar circuits). Each of the circuits accepts low level outputs from the Timing Generator 30 along lines 35 (FIG. 1) and produces a 48 volt D.C. pulse of a cadence determined by the signal from time generator 30 capable of driving an one amp conductive load. The outputs of the Cadence Power Output (lines 59 of FIG. 1) are each short circuit and transient protected as hereinafter described.

Figure 3:
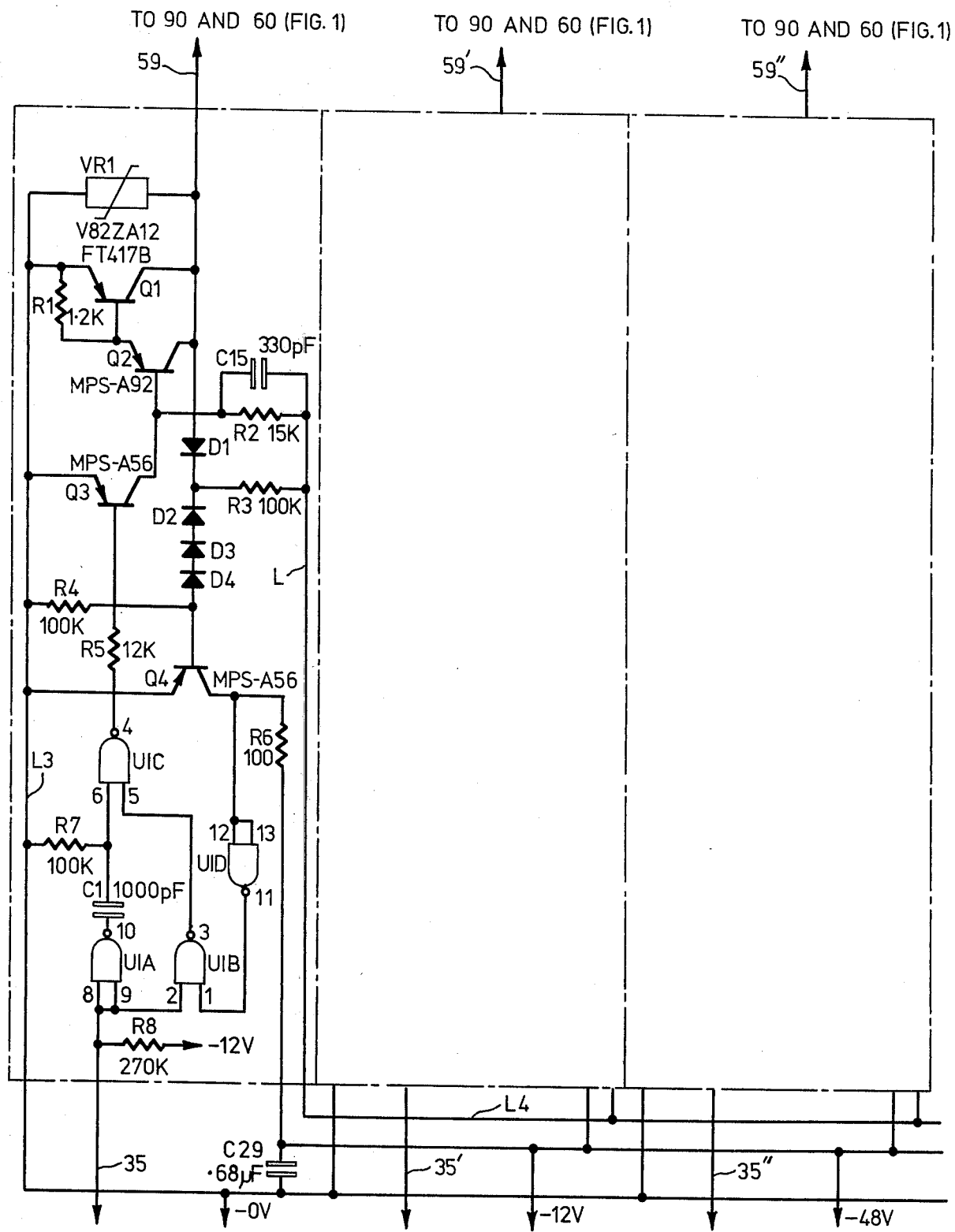
FIG. 3 is a detailed drawing of part of the power cadence output circuit.

Three similar circuits are indicated in FIG. 3; the left hand one only, being shown in detail. Each circuit has its output connectable to switching means 90 over a line 59, 59' or 59" and the connection to a load will of course provide a return over the circuitry to the −48 V indicated in FIG. 3. The circuitry to be described will provide on a line 59, 59' or 59" a D.C. 48 volt pulse at cadences corresponding to the signals received from Timing Generator 30 on respective lines 35, 35' or 35". Thus only the left hand one of the power cadence output circuits will be described as representatives of all three. In this circuit line L3 is connected to zero volts and is connected to line 59 when the Darlington pair Q1, Q2 are on. Transients between lines L3 and 59 are limited to about 80 volts by the two way zener device VR1.

Lead 35 is connected to receive an output from the Cadence Timing Generator and goes high when there is a pulse to be placed on line 59. When the Darlington configuration Q1 and Q2 is "off" the voltage at the base of Q4 is negative and the transistor is "ON" when line 35 is low U1B-2 provides through the logic circuitry the "low" to the base of Q3 which maintains Q3 "ON", and the Darlington pair Q1 and Q2 "OFF".

When a high appears on line 35 (indicating a requirement for a 48 volt DC pulse on line 59) then this high appears at U1-8, U1-9 and U1-2. This has no effect at U1B-2 because of the low input on U1B-1 due to conduction at Q4. However the high at U1A-8, 9 input produces a low at U1A-10 and this, in turn causes capacitor C1 and resistor R7 to produce a 100 micro second low going transient which when applied to U1C-6 produces a high applied to the base of Q3 to turn Q3 off which allows the Darlington pair Q1 Q2 to turn on. With the Darlington pair on, the voltage drop across Q1 and D1 is small enough, if there is no overload on line 59, to result in turning off Q4. With no such overload Q4 off produces a low at U1D-12 and -13 and the resultant high at U1B-1 combined with that at U1B-2 from line 35 produces a low at U1C-5 which produces a high at U1C-4 to maintain Q3 turned off when the 100 micro second pulse ends at U1C6.

Thus in the event there is no overload on line 59 the full Cadence Pulse (as called for by Timing Generator 30 on line 35) sent over line 59. For the first 100 micro seconds the output pulse is as a result of the transient from C1-R7 and for remainder of the pulse period, the output continue because Q1 on (with no overload) turns Q4 off and Q3 is maintained off by the two highs at U1B-2 and -1. At the end of the pulse period line 35 and U1B-2 go low, U1C-6, -5 are high Q3 is turned on and Q1 and Q2 turned off removing the pulse from the line and allowing Q4 to turn on. Thus with no overload on the line this cycle will be continued with Q4 only "on" when there is no pulse on the 59 or during an overload conditions.

In the event of an overoad this must occur during a pulse period (high on line 35) then line 59 will assume a lower voltage with Q1 on. As before Q4 will be on when there is no input high on line 35. When the input cadence signal commences (high on line 35) the 100 micro second pulse from U1A-10 will turn off Q3 and turn on Q1 and Q2. However the overload on the line 59 prevents the voltage between D1 and D2 from rising to a value which will turn Q4 off. Thus Q4 is on supplying a high at U1B-13, a low to U1B-1, a high to U1C-5 which at the end of the 100 micro second low transient will combine with a high at U1C-6 to produce a low at Q3 turning Q3 on and turning Q1 and Q2 off so that Q4 remains low. Thus for the remainder of the pulse period of that cycle Q1 is kept off the line (and for the remainder of similar pulse periods as long as the overload continues). The sequence last described will be repeated and the line and equipment will not be damaged by the 100 micro second pulse. As soon as the overload is corrected then on the following cycle when Q1 and Q2 are turned on by the 100 micro second pulse the voltage between D1 and D2 will be sufficient to keep Q4 off for the remainder of the pulse period and the full output pulse will be sent. Thus the circuit will protect the line 59 and connected equipment from overload and will allow the output pulses to resume at the first pulse period after the overload is removed. The circuitry of the other circuits is similar, each being adapted to produce D.C. pulses on a line 59', 59" as called for by the timing signal on line 35', 35".

OUTPUT DETECTOR

Figure 7:
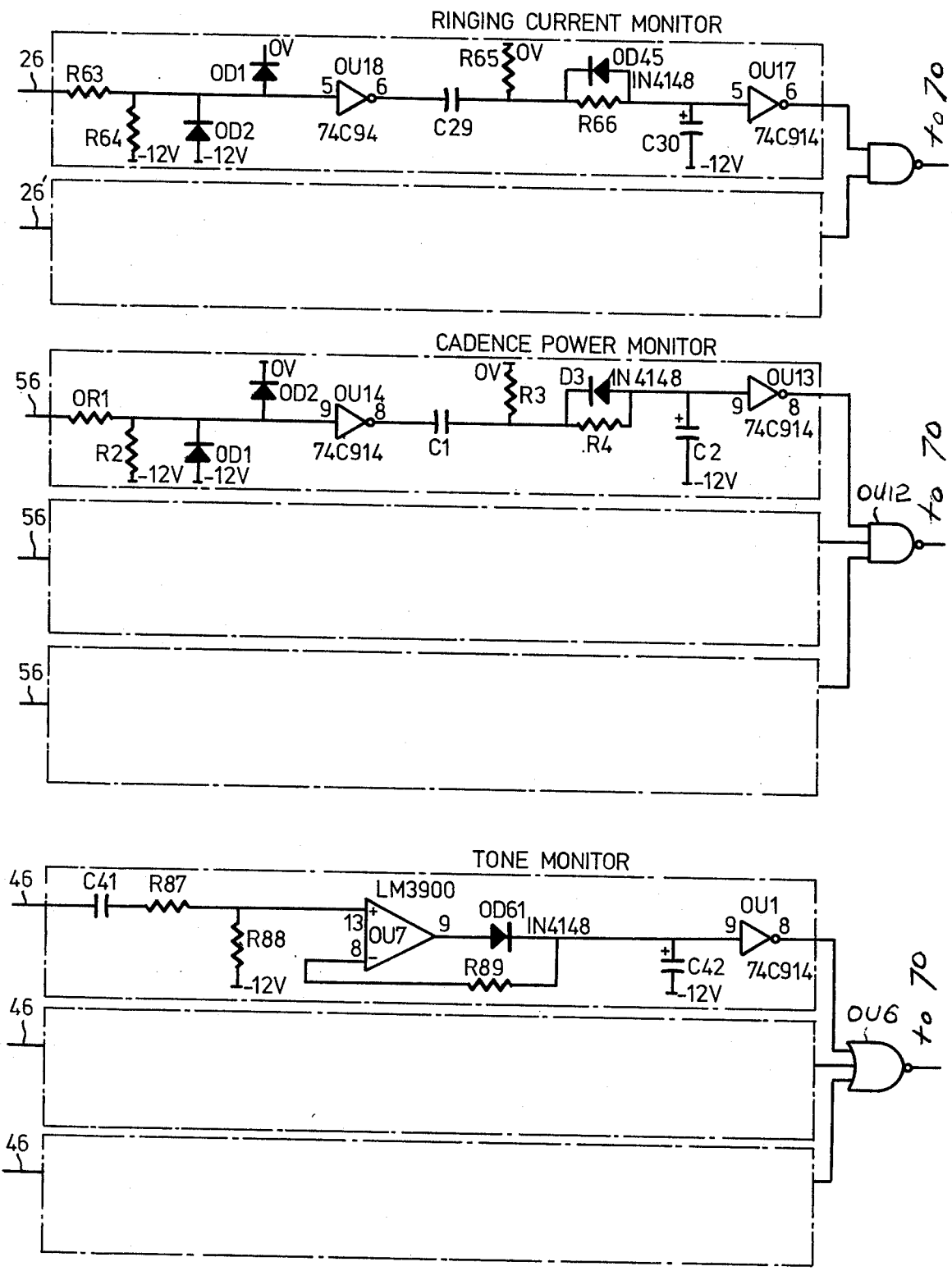
FIG. 7 is a detailed drawing of a part of the output detector.

The output detector (60 of FIG. 1 and FIG. 7) is designed to monitor the outputs which may be classified in three groups (a) Power Cadence Outputs (from block 50), (b) ringing current outputs (from block 20) and (c) the tone outputs (from block 40). FIG. 7 shows one circuit for monitoring each type of output with schematic indication of similar circuits.

As shown in the FIG. 7 a circuit to monitor a Power Cadence Output ("CADENCE POWER MONITOR" FIG. 7) (on a line 56 (FIG. 1)) consists basically of a limiting resistor OR1, protective diodes OD1 and OD2, and Schmitt Trigger OU14. Protective diodes OD1 and OD2 effectively limit the voltage swing, which is 0 to 48 volts at input line 56 to between 0 and −12 V. This part of the circuit, on receipt at line 56 of 48 V DC pulses produces at the output OU14-8 a 12 volt square wave which is inversely shaped to the 48 volt input pulses and the pulse at OU14-8 is integrated at capacitor C1 and extended to timing circuit C2, R4 and D3. (It will be noted that OU14 contains internally (and not shown) connections from terminal 8 through resistances to −12 V, and 0 V which create connections under changing current flows transferred across C1). As long as the pulses from OU14-8 are reaching the timing circuit with proper frequency, the capacitor C2 voltage at terminal 9 of invertor OU13 is kept low by a discharge path during negative portions of the pulses over D3, C1 and the internal resistance to negative at OU14. In case of a fault (which may appear on the line 56 and the input of U14-9 as a continuous high voltage, a continuous low voltage or as an open line, the voltage varying pulses through C1) are no longer present and C2 will slowly charge up over R3 and R4 until it reaches the threshold voltage of OU13. (The timing characteristics and the parameters so far described are selected so that the threshold will only be reached after a one of the three steady state conditions at OU14-9 has persisted for a sufficiently long time as to be inconsistent with the characteristics of the cadence expected at connected line 56). When the voltage on C2 passes above the threshold voltage, the output OU13-8 goes low indicating a fault.

A circuit as just described is provided for each cadence power output of Power Cadence Output 30. The respective outputs of the U13-8 terminals are 'ANDED' at NAND Gate OU12 which performs a negative going "NOR" function. When all inputs to NOR gate OU12 are high, indicating no faults, the output OU12-13 is low indicating a no fault condition. However if any one of the inputs to NAND gate OU12 goes low, indicating a fault the output OU12-13 of NAND gate OU12 goes high signalling a fault. This fault signal is supplied to system control 70 may be used in any of a number of manners well known to those skilled in the art to signal a fault for causing manual switching of the circuit from the Power Cadence Output in use to the back-up, or may be used at control 70 to automatically switch the switching means 90 from the Cadence Power Circuit in use to the back up Cadence Power Output. This switching be performed in any of many alternative manners well known to those skilled in the art and, it will be noted that, in accord with the invention, the Power Cadence Output may be switched from the one output to the other, without affecting or switching the supply of the Ringing Circuit Output or the Tone Generator Circuit output. Thus the circuitry just described will be provided or available for either of the duplicated or dual Power Cadence Outputs 50.

The detection means for the Ringing Circuit ("Ringing Current Monitor" in FIG. 7) outputs operates in the same manner as that for the power cadence output. The circuit as shown is the same with the time delays and parameters adjusted to detect a fault in the Ringing Currents on lines 26 if the absence of ringing current in the particular ringing circuit being monitored. It should be noted that a ringing current period involves a period when the 20 or 25 cycle ringing current is applied. The 20 or 25 cycle alternating current causes small fluctations in the charge on capacitor C30 but does not substantively alter the fact that capacitor C30, the time delay circuit and the parameters detect the absence of ringing current for an unduly long time as with the power cadence output. The only exception is with the continuous ringing current (line 26" FIGS. 6A-6B) where the timing parameters and other parameters of the circuit are designed so that the voltage level at C30 is kept down under normal fluctuations by the negative AC excursions).

The detector means for each Tone Generator Output is differently designed from those used with the Power Cadence Outputs and Ringing Circuits Outputs since the latter have much higher voltages than the Tone Generator Outputs.

The Tone Generator Output detector circuit ("Tone Monitor" in FIG. 7) is essentially a level detector comprising the operational amplifier OU7 with the associated resistor R89 and diode D61 as coupling devices and the circuitry is designed so that proper tone input on a line 46 maintains the voltage on C42 above the threshold of OU1-9. If the tone signal on the line 46 fails (is continuously high, low or an open line) OU7-9 does not provide the positive going portions of the signal through OD61 and C42 starts discharging through R89. When the voltage at OU1-9 falls below the threshold of OU1 a fault is indicated by a high output at OU1-8. Thus when there is no fault the output of U1-8 is low but when U1-8 goes high a fault is indicated.

The outputs of OU1-8 are connected to the input of NOR gate OU6 which provides, when all inputs are low, indicating no fault in the tone circuits, high output at OU6-13. When a fault at one of the tone circuits produces a high at an output OU1-8, this results in a low output at OU6-13. The low output may be used, as with the outputs of the NAND gates for the Power Cadence Outputs and the Ringing Circuits to give a visual indication or initiate automatic switching of the tone supply at switching means 100 to the back up circuit.

It is emphasized that the output detector will be available to detect the relevant outputs of components 20, 40, 50 of either of the dual circuits, which is connected to the output and also that a fault in any of the connected outputs of a block 20, 40 or 50 may cause replacement by its back-up at switching means 80, 100 or 90, respectively without switching the other switching means.

I claim:

1. Telephone ringing current circuit comprising an AC supply and a D.C. supply, and a output line, first switching means responsive to a first control signal for connecting over a first connection said D.C. supply and said AC supply, in series, to said output line and responsive to a second control signal for the disconnection of said AC supply from said output line, second switching means, operable on said second control signal, for connecting over a second connection, said D.C. supply to said output line, said second switching means being controlled to open said second connection when said first connection is made, wherein means are provided for completing said first connection responsive to said first control signal at approximately a zero crossing of said AC supply.

2. Telephone ringing current circuit comprising an AC supply and a D.C. supply, and an output line, first switching means responsive to a first control signal for connecting over a first connection said D.C. supply and said AC supply, in series, to said output line and responsive to a second control signal for the disconnection of said AC supply from said output line, second switching means, operable on said second control signal, for connecting over a second connection, said D.C. supply to said output line, said second switching means being controlled to open said second connection when said first connection is made, wherein means are provided for completing said first connection responsive to said first control signal at approximately a zero crossing of said AC supply and means are provided for opening said first connection at approximately another zero crossing of said A.C. supply.

3. Telephone ringing current circuit comprising an AC supply and a D.C. supply, and an output line, first switching means responsive to a first control signal for connecting over a first connection said D.C. supply and said AC supply, in series, to said output line and responsive to a second control signal for the disconnection of said AC supply from said output line, second switching means, operable on said second control signal, for connecting over a second connection, said D.C. supply to said output line, said second switching means being controlled to open said second connection when said first connection is made, including means for sensing an overload during the existence of said first connection and, responsive thereto, disconnecting said first connection.

4. Telephone ringing current circuit comprising an AC supply and a D.C. supply, and an output line, first switching means responsive to a first control signal for connecting over a first connection said D.C. supply and said AC supply, in series, to said output line and responsive to a second control signal for the disconnection of said AC supply from said output line, second switching means, operable on said second control signal, for connecting over a second connection, said D.C. supply to said output line, said second switching means being controlled to open said second connection when said first connection is made, including means for sensing an overload during the existence of said second connection and, responsive thereto preventing current flow through said second connection.

5. Telephone ringing current circuit comprising an AC supply and a D.C. supply, and an output line, first switching means responsive to a first control signal for connecting over a first connection said D.C. supply and said AC supply, in series, to said output line and responsive to a second control signal for the disconnection of said AC supply from said output line, second switching means, operable on said second control signal, for connecting over a second connection, said D.C. supply to said output line, said second switching means being controlled to open said second connection when said first connection is made, wherein said D.C. supply is connectable by said first switching means along said first connection through the A.C. supply to said output line, said first switching means being operable to complete said first connection, responsive to said first control signal and to open said first connection responsive to said second control signal, the D.C. supply is connectable through second switching means to the output line by said second connection, said second switching means being operable responsive to said second control signal to complete said second connection and operable when said first connection is made to open said second connection.

6. Telephone ringing current circuit comprising an AC supply and a D.C. supply, and an output line, first switching means responsive to a first control signal for connecting over a first connection said D.C. supply and said AC supply, in series, to said output line and responsive to a second control signal for the disconnection of said AC supply from said output line, second switching means, operable on said second control signal for connecting over a second connection, said D.C. supply to said output line, said second switching means being controlled to open said second connection when said first connection is made, wherein means are provided for detecting current flow over either of said first or second connections, means responsive to detection by said means of current flow over a predetermined amount to open said first switching means if it is then connecting said supplies in series to said output line.

7. The telephone ringing current current as claimed in claim 6 combined with means responsive to said detection and opening of said first switching means for resetting said first and second switching means circuitry.

8. The telephone ringing current circuit as claimed in claim 6 combined with third switching means arranged when opened to prevent flow to either of said first or second connections, wherein said means for detecting over current flow and said third switching means are designed to cause opening of said third switching means on said over current detection.

9. The telephone ringing current circuit as claimed in claim 8 combined with means response to said detection for resetting said third switching means after opening of said first switching means.

10. The telephone ringing current circuit as claimed in claim 9 combined with means responsive to opening of said first switching means on over current detection for resetting said first and second means circuitry.

11. A plurality of telephone ringing circuits, an AC supply and a DC supply wherein each circuit comprises:

an output line, a first connection, a second connection, first switching means responsive to a first control signal for connecting over said first connection said D.C. supply and said A.C. supply, in series, to said output line; and responsive to a second control signal for the disconnection of said AC supply from said output line, second switching means, operable on said second control signal, for connecting over said second connection said D.C. supply to said output line, said second switching means being controlled to open said second connection when said first connection is made;

wherein each said first switching means is independently responsive to first and second control signals, including means for sensing an overload in one of said output lines and, responsive thereto, opening any first switching means then closed.

12. A plurality of telephone ringing circuits as claimed in claim 11 combined with means responsive to said detection and opening of a first switching means for resetting circuitry corresponding to said first switching means for re-connection of said D.C. supply and A.C. supply in series over said first connection on receipt of the next corresponding first control signal.

13. A plurality of telephone ringing circuits as claimed in claim 11 including third switching means connected to control AC or DC flow to all said plurality of output lines and connected to open responsive to detection of an overload.

14. A plurality of telephone ringing circuits as claimed in claim 13 wherein said third switching means is operable to reclose after the opening of any first switching means responsive to said detection.

* * * * *